(12) United States Patent
Tian et al.

(10) Patent No.: US 10,822,811 B2
(45) Date of Patent: Nov. 3, 2020

(54) SCRATCH RESISTANT COATING (71) Applicant: ARMSTRONG WORLD INDUSTRIES, INC., Lancaster, PA (US)

(72) Inventors: Dong Tian, Lancaster, PA (US); Jeffrey S. Ross, Lancaster, PA (US)

( * ) Notice: Subject to any disclaimer, the term of this patent is extended or adjusted under 35 U.S.C. 154(b) by 633 days.

(21) Appl. No.: 14/678,163

(22) Filed: Apr. 3, 2015

(65) Prior Publication Data

US 2016/0289980 A1 Oct. 6, 2016

(51) Int. Cl.
| | | |
|---|---|---|
| *E04F 15/12* | (2006.01) | |
| *E04F 15/02* | (2006.01) | |
| *B05D 1/28* | (2006.01) | |
| *B05D 1/38* | (2006.01) | |
| *B05D 7/00* | (2006.01) | |
| *C09D 133/14* | (2006.01) | |
| *C09D 135/02* | (2006.01) | |
| *C09D 183/06* | (2006.01) | |

(52) U.S. Cl.
CPC ............... *E04F 15/12* (2013.01); *B05D 1/28* (2013.01); *B05D 1/38* (2013.01); *B05D 7/536* (2013.01); *C09D 133/14* (2013.01); *C09D 135/02* (2013.01); *C09D 183/06* (2013.01); *E04F 15/02* (2013.01)

(58) Field of Classification Search
CPC ...................................................... E04F 15/12
USPC .................................................. 428/323, 143
See application file for complete search history.

(56) References Cited

U.S. PATENT DOCUMENTS

| | | | |
|---|---|---|---|
| 4,131,602 A | 12/1978 | Hodakowski | |
| 5,492,769 A * | 2/1996 | Pryor | B05D 5/02 |
| | | | 428/552 |
| 5,928,778 A | 7/1999 | Takahashi et al. | |
| 6,228,433 B1 | 5/2001 | Witt | |
| 6,291,078 B1 * | 9/2001 | Chen | D06N 3/0063 |
| | | | 428/195.1 |
| 7,858,188 B2 | 12/2010 | Hayakawa | |
| 8,754,145 B1 | 6/2014 | Haubrich et al. | |
| 2003/0153643 A1 | 8/2003 | Jin et al. | |
| 2007/0116933 A1 | 5/2007 | Kobayashi et al. | |
| 2007/0134488 A1* | 6/2007 | Hayakawa | A47J 36/02 |
| | | | 428/323 |
| 2011/0023726 A1 | 2/2011 | Nesbitt | |
| 2012/0100366 A1 | 4/2012 | Dumm et al. | |
| 2012/0260582 A1 | 10/2012 | Sung | |
| 2013/0267154 A1* | 10/2013 | Sung | B24D 18/0054 |
| | | | 451/443 |
| 2014/0220354 A1 | 8/2014 | Gao et al. | |
| 2016/0289979 A1 | 10/2016 | Tian et al. | |

FOREIGN PATENT DOCUMENTS

| | | |
|---|---|---|
| EP | 1068083 | 1/2001 |
| JP | 2006322188 | 11/2006 |

OTHER PUBLICATIONS

Innternational Search Report for Corresponding Application No. PCT/US2016/24457, dated Jun. 20, 2016.

* cited by examiner

*Primary Examiner* — Alicia J Sawdon (57) ABSTRACT

An abrasion resistant flooring covering formed from a UV curable coating composition having binder and diamond particles—the abrasion resistant flooring covering used to overcoat the surface of flooring products or various abrasion heavy surfaces to protect such a products or surfaces from damage by abrasion or scratch.

20 Claims, 3 Drawing Sheets

SCRATCH RESISTANT COATING

FIELD OF INVENTION

Embodiments of the present invention relate to an abrasion resistant coating for flooring tiles and panels, methods for preparing and applying the abrasion resistant coating, and flooring systems comprising the abrasion resistant coating.

BACKGROUND

Heretofore, curable coating compositions have been used as overcoat materials to cover the surface of flooring products or various abrasion heavy surfaces to protect such products or surfaces from damage by abrasion or scratch. However, previous attempts at creating abrasion resistant coatings have required large amounts of abrasion resistant particles—namely aluminum oxide—and have failed to appreciate size distribution of abrasion resistant particles, thereby leading to inefficient usage of abrasion resistant filler in coatings.

SUMMARY

Some embodiments of the present invention are directed to a floor covering comprising a substrate, and a coating layer. The coating layer may comprise a coating matrix and diamond particles. The coating matrix may be formed from a curable coating composition comprising a binder. The coating matrix has an average coating matrix thickness and the diamond particles may have an average particle size between 2 µm and 50 µm, which particles have the average particle size having a narrow distribution. The narrow distribution of particle sizes may have a standard deviation less than 35% of the average particle size. According to some embodiments of the present invention, a ratio of the average coating matrix thickness to average particle size ranges from 0.6:1 to 2:1.

Some embodiments of the present invention include a floor covering comprising a substrate and a coating layer. The coating layer comprises a coating matrix and diamond particles. The coating matrix may be formed from a curable coating composition comprising a binder. The coating matrix has an average coating matrix thickness and the diamond particles that have an average particle size. According to some embodiments of the present invention, a ratio of the average coating matrix thickness to the average particle size ranges from about 0.6:1 to 2:1. In some embodiments the diamond particles have an average distance between two adjacently placed particles of from 30 µm to 65 µm, which is measured between the centers of the adjacent particles.

In some embodiments, the present invention is directed to the floor covering comprising a substrate and a coating layer. The coating layer may be formed from a curable coating composition comprising a binder and abrasion resistant particles consisting essentially of diamond particles. The diamond particles may have an average particle size and a narrow distribution of particle sizes. The narrow distribution of particle sizes has a standard deviation less than 35% of the average particle size. According to some embodiments of the present invention, the diamond particles are present in an amount ranging from about 2 wt. % to about 5.5 wt. % based on the total weight of the coating layer.

According to some embodiments, the present invention is directed to a method of forming a multi-layer coated floor covering. In a first step, a curable coating composition, such as ultraviolet (UV) or moisture curable, is formed by first mixing the ingredients of the coating composition with high speed agitation to form a coating matrix, followed by adding diamond particles to the coating matrix and mixing with high speed agitation, wherein the diamond particles have an average particle size. Subsequently, a first layer of the coating composition may be applied to a substrate by any suitable coating method, including roll coating. The first layer may be applied such that the coating matrix exhibits a first average coating matrix thickness. According to some embodiments, the first layer may then be partially or fully cured with, for example, UV radiation. The partial curing may take place prior to the diamond particles embedded within the coating matrix of the first layer are able to fully settle in the coating matrix. Subsequently, a second layer of the coating composition may be applied to the top surface of the first layer by, for example, roll coating, thereby forming a multilayer coated surface. The second layer may be applied such that the coating matrix exhibits a second average coating matrix thickness. According to some embodiments, the second layer may then be partially or fully cured with UV radiation. The partial curing may take place prior to the diamond particles embedded within the coating matrix of the second layer are able to fully settle in the coating matrix. One or more of additional coating layers may be applied on the second layer. Once the multilayer coated surface is formed, the multilayer coated surface can be fully cured, if any of the previously applied layers is only partially cured. The term partial curing as used herein refers to curing a coated layer to a nonfluid state (i.e., semi-solid or solid) that may be tacky to the touch.

In some embodiments, the ratio of the average coating layer thickness of the first layer and the average particle size for the diamond particles may range from 0.6:1 to 2:1. In some embodiments the partial curing of the coating matrix of the first layer results in the diamond particle being vertically offset from a bottom surface of the coating matrix of the first layer by a first length. In some embodiments, the ratio of the average coating layer thickness of the second layer and the average particle size for the diamond particles ranges from 0.6:1 to 2:1. In some embodiments the partial curing of the coating matrix of the second layer results in the diamond particle being vertically offset from a bottom surface of the coating matrix of the second layer by a second length.

In some embodiments of a multilayered coated surface, the diamond particles can be present only in selected layers of the multilayers. For example, only the last layer contains the diamond particles.

BRIEF DESCRIPTION OF THE DRAWINGS

The features of the exemplary embodiments of the present invention will be described with reference to the following drawings, where like elements are labeled similarly, and in which.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The present invention is directed to floor coverings comprising a substrate and an abrasion resistant coating layer. The abrasion resistant coating layer may comprise coating matrix and abrasion resistant particles. The coating matrix may be a curable coating composition comprising a binder. According to some embodiments, the binder may comprise acrylate-functional compounds and the abrasion resistant particles comprise diamond particles.

According to some embodiments of the present invention, the binder may comprise resin selected from acrylate-functional polymer, acrylate-functional oligomer, acrylate-functional monomer, and combinations thereof. The acrylate-functional polymer may include polyester acrylate, polyurethane acrylate, polyether acrylate, polysiloxane acrylate, and polyolefin acrylate.

In some embodiments, the polyester acrylate according to the present invention may be a linear or branched polymer having at least one acrylate or (meth)acrylate functional group. In some embodiments, the polyester acrylate of the present invention has at least 1 to 10 free acrylate groups, (meth)acrylate groups, or a combination thereof.

In some embodiments, the polyester acrylate has an acrylate functionality. The polyester acrylate may be the reaction product of polyester polyol and an carboxylic acid functional acrylate compound such as acrylic acid, (meth) acrylic acid, or a combination thereof at a OH:COOH ratio of about 1:1. The polyester polyol may be a polyester diol having two hydroxyl groups present at terminal end of the polyester chain. In some embodiments, the polyester polyol may have a hydroxyl functionality ranging from 3 to 9, wherein the free hydroxyl groups are present at the terminal ends of the polyester chain or along the backbone of the polyester chain.

In non-limiting embodiments, the polyester polyol may be the reaction product of a hydroxyl-functional compound and a carboxylic acid functional compound. The hydroxyl-functional compound is present in a stoichiometric excess to the carboxylic-acid compound. In some embodiments the hydroxyl-functional compound is a polyol, such a diol or a tri-functional or higher polyol (e.g. triol, tetrol, etc.). In some embodiments the polyol may be aromatic, cycloaliphatic, aliphatic, or a combination thereof. In some embodiments the carboxylic acid-functional compound is dicarboxylic acid, a polycarboxylic acid, or a combination thereof. In some embodiments, the dicarboxylic acid and polycarboxylic acid may be aliphatic, cycloaliphatic, aromatic, or a combination thereof.

In some embodiments the diol may be selected from alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol. In some embodiments, the tri-functional or higher polyol may be selected from trimethylol propane, pentaerythritol, di-pentaerythritol, trimethylol ethane, trimethylol butane, dimethylol cyclohexane, glycerol and the like.

In some embodiments the dicarboxylic acid may be selected from adipic acid, azelaic acid, sebacic acid, succinic acid, glutaric acid, decanoic diacid, dodecanoic diacid, phthalic acid, isophthalic acid, 5-tert-butylisophthalic acid, tetrahydrophthalic acid, terephthalic acid, hexahydrophthalic acid, methylhexahydrophthalic acid, dimethyl terephthalate, 2,5-furandicarboxylic acid, 2,3-furandicarboxylic acid, 2,4-furandicarboxylic acid, 3,4-furandicarboxylic acid, 2,3,5-furantricarboxylic acid, 2,3,4,5-furantetracarboxylic acid, cyclohexane dicarboxylic acid, chlorendic anhydride, 1,3-cyclohexane dicarboxylic acid, 1,4-cyclohexane dicarboxylic acid, and anhydrides thereof, and mixtures thereof. In some embodiments the polycarboxylic acid may be selected from trimellitic acid and anhydrides thereof.

In some embodiments, the acrylate-functional polyurethane according to the present invention may be a linear or branched polymer having at least one functional group selected from an acrylate group or a (meth)acrylate group. In some embodiments, the acrylate-functional polyurethane has at least 2 to 9 functional groups selected from an acrylate group, a (meth)acrylate group, or a combination thereof. In some embodiments, the acrylate-functional polyurethane has between 2 and 4 functional groups selected from an acrylate group, (meth)acrylate group, or a combination thereof.

In some embodiments, the acrylate functional polyurethane may be the reaction product of a high molecular weight polyol and diisocyanate, polyisocyanate, or a combination thereof. The high molecular weight polyol may be selected from polyester polyol, polyether polyol, polyolefin polyol, and a combination thereof—the high molecular weight polyol having a hydroxyl functionality ranging from 3 to 9.

In some embodiments, the polyester polyol used to create the acrylate-functional polyurethane is the same as used to create the acrylate functional polyester. In some embodiments, the polyether polyol may be selected from polyethylene oxide, polypropylene oxide, polytetrahydrofuran, and mixtures and copolymers thereof.

The high molecular weight polyol may be reacted with polyisocyanate, such as a diisocyanate, a tri-functional isocyanate (e.g. isocyanurate), higher functional polyisocyanates, or a combination thereof in an NCO:OH ratio ranging from about 2:1 to 4:1. The polyisocyanate may be selected from isophorone diisocyanate, 4,4'-dicyclohexylmethane-diisocyanate, and trimethyl-hexamethylene-diisocyanate, 1,6-hexamethylene diisocyanate, 2,2,4-trimethylhexamethylene diisocyanate, octadecylene diisocyanate and 1,4 cyclohexylene diisocyanate, toluene diisocyanate; methylenediphenyl diisocyanate; tetra methylxylene diisocyanate, and isocyanurates, biurets, allophanates thereof, as well as mixtures thereof. The resulting reaction product is an isocyanate-terminated prepolymer.

The isocyanate-terminated prepolymer is then reacted with hydroxyl-functional acrylate compound in an NCO:OH ratio of about 1:1 to yield an acrylate or (meth)acrylate functional polyurethane. The hydroxyl-functional acrylate compounds may include hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate, and a combination thereof.

According to some embodiments of the present invention, the binder may comprise acrylate-functional oligomers that include mono-functional oligomers, di-functional oligomers, tri-functional oligomers, tetra-functional oligomers, penta-functional oligomers, and combinations thereof.

In some non-limiting embodiments the mono-functional oligomers may be selected from alkoxylated tetrahydrofurfuryl acrylate; alkoxylated tetrahydrofurfuryl methylacrylate; alkoxylated tetrahydrofurfuryl ethylacrylate; alkoxylated phenol acrylate; alkoxylated phenol methylacrylate; alkoxylated phenol ethylacrylate; alkoxylated nonylphenol acrylate; alkoxylated nonylphenol methylacrylate; alkoxylated nonylphenol ethylacrylate, and mixtures thereof. The alkoxylation may be performed using ethylene oxide, propylene oxide, butylene oxide, or mixtures thereof. In some embodiments the degree of alkoxylation ranges from about 2 to 10. In some embodiments, the degree of alkoxylation ranges from about 4 to 6.

In some non-limiting embodiments the di-functional oligomers may be selected from ethylene glycol diacrylate, propylene glycol diacrylate, diethylene glycol diacrylate, dipropylene glycol diacrylate, triethylene glycol diacrylate, tripropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol propoxylated cyclohexanedimethanol, diacrylate, and mixtures thereof.

In some non-limiting embodiments, the tri-functional oligomers may be selected from trimethylol propane triacrylate, isocyanurate triacrylate, glycerol triacrylate, ethoxylated trimethylolpropane triacrylate, propoxylated trimethylolpropane triacrylate, tris(2-hydroxyethyl)isocyanurate triacrylate, ethoxylated glycerol triacrylate, propoxylated glycerol triacrylate, pentaerythritol triacrylate, melamine triacrylates, and mixtures thereof.

In some non-limiting embodiments, the acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

Some embodiments of the present invention may further include acrylate functional monomers selected from alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyethyl acrylate, ethoxypropyl acrylate, etc.; hydroxyalkyl acrylates such as hydroxyethyl acrylate, hydroxybutyl acrylate, etc.; alkenyl acrylates such as trimethoxyalloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymethyl acrylate, 2-(N-methylcarbamoyloxy)-ethyl acrylate, 2-(N-ethylcarbamoyloxy)ethyl acrylate, etc.; and the corresponding methacrylates. In some embodiments, the alkyl acrylates having up to about 12 carbon atoms in the alkyl segment may be used as a reactive solvent/diluent in the abrasions resistant coating layer.

The acrylate-functional monomers may include the binder may comprise resin selected from acrylate-functional polymer, acrylate-functional oligomer, acrylate-functional monomer, or a combination thereof.

In some non-limiting embodiments, the acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

In some embodiments, the acrylate-functional monomer or oligomer is a silicone acrylate. Curable silicone acrylates are known and suitable silicone acrylates are disclosed, for example in U.S. Pat. Nos. 4,528,081 and 4,348,454. Suitable silicone acrylates include silicone acrylates having mono-, di-, and tri-acrylate moieties. Suitable silicone acrylates include, for example, SILCOLEASE® UV RCA 170 and UV Poly 110, available from Blue Star Co. Ltd, China; and SILMER® ACR D2, SILMER® ACR Di-10, SILMER® ACR Di-50 and SILMER® ACR Di-100, available from Siltech.

The coating matrix may further comprise photoinitiator to facilitate UV curing of the curable coating composition. In some non-limiting embodiments, the photoinitiators may include a benzoin compound, an acetophenone compound, an acylphosphine oxide compound, a titanocene compound, a thioxanthone compound or a peroxide compound, or a photosensitizer such as an amine or a quinone. Specific examples photoinitiatiors include 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, dibenzyl, diacetyl and beta-chloroanthraquinone. In some embodiments, the photoinitators are water soluble alkylphenone photoinitiators.

The coating matrix may further comprise an amine synergist. In some embodiments, the amine synergist may include diethylaminoethyle methacrylate, dimethylaminoethyl methacrylate, N-N-bis(2-hydroxyethyl)-P-toluidine, Ethyl-4-dimethylamino benzoate, 2-Ethylhexyl 4-dimethylamino benzoate, as well as commercially available amine synergist, including Sartomer CN 371, CN373, CN383, CN384 and CN386; Allnex Ebecry P104 and Ebecry P115. The amine synergist may be present in the radiation curable coating composition by an amount ranging from about 1 wt. % to about 5 wt. %, preferably about 3 wt. %

The coating layer of the present invention includes abrasion resistant particles that help impart wear and scratch resistance to the overall coating layer. The improved wear and scratch resistance extends the life span of the floor covering. Examples of previous attempts to use abrasion resistant particles to improve wear and scratch resistance of flooring products include using aluminum oxide particles. According to the present invention, the primary abrasion resistant particles are diamond particles. The diamond particles exhibit a Mohs hardness value of 10 as measured on the Mohs scale of mineral hardness.

According to some embodiments, the diamond particles selected for the coating layer may have a variety of particle sizes including a mixture of different sized diamond particles. However, according to some embodiments, the diamond particles have a narrow size distribution. According to this invention, the term narrow size distribution means a standard deviation that is no more than 35%, preferably less than 35%, of the average particle size for a given diamond particle blend or mixture. In some embodiments, the standard deviation is less than 25% based on the average particle size for a given diamond particle blend or mixture. In some embodiments, the standard deviation is less than 15% based on the average particle size for a given diamond particle blend or mixture.

In some non-limiting embodiments, the diamond particles of the present invention may have an average particle size that is selected from the range of about 2 μm to about 50 μm, preferably about 4 μm to about 35 μm. In some non-limiting embodiments, the diamond particles of the present invention may have an average particle size that is selected from range of about 6 μm to about 25 μm. The term "about" means +/− percentage change of 5%.

In some non-limiting embodiments of the present invention, the diamond particles may be a first mixture of diamond particles that has particle sizes ranging from about 6 μm to about 11 μm, preferably from about 6 μm to about 10 μm—including all integers therebetween and mixtures thereof. According to some embodiments, the first mixture of diamond particles may include diamond particles having an average particle size of about 6 μm, about 7 μm, about 8, μm, about 9 μm, about 10 μm, or 11 μm.

In some embodiments, the first mixture of diamond particles may have the following particle size distribution:

| Distribution % | 10 | 20 | 30 | 40 | 50 | 60 | 70 | 80 | 90 | 100 |
|---|---|---|---|---|---|---|---|---|---|---|
| Size (μm) | 6.04 | 6.61 | 7.03 | 7.43 | 7.83 | 8.27 | 8.77 | 9.4 | 10.45 | 11.46 |

Wherein the average particle size is represented at the 50% distribution point (i.e. about 8 μm) and the standard deviation is about 1.7, making the standard deviation about 21% of the average particle size.

It is possible that the first mixture may contain diamond particle having particle sizes outside of the about 6 micron to about 10 micron range so long as the standard deviation for the first mixture is not greater than 35%, preferably less than 35%. In some embodiments, it is possible that the first mixture may contain diamond particle having particle sizes outside of the about 6 micron to about 10 micron range so long as the standard deviation for the first mixture is less than 25%, preferably less than 15%. In some embodiments, the first mixture may contain up to 4 wt. % of diamond particles having a particle size that is less than 6 μm. In some non-limiting embodiments, the first mixture may contain up to 4 wt. % of diamond particles having a particle size that is less than 6 μm. In some embodiments, the first mixture may contain up to 6.54 wt. % of diamond particles having a particle size that is greater than 11 μm.

In some non-limiting embodiments of the present invention, the diamond particles may be a second mixture of diamond particles that has particle sizes ranging from about 15 μm to about 30 μm, preferably about 15 μm to about 25 μm—including all integers therebetween and mixtures thereof. According to some embodiments, the second mixture of diamond particles may have an average particle size of about 15 μm, about 16 μm, about 17 μm, about 18, μm, about 19 μm, about 20 μm, about 21 μm, about 22 μm, about 23 μm, about 24 μm, or about 25 μm.

In some embodiments, the second mixture of diamond particles may have the following particle size distribution:

| Distribution % | 10 | 20 | 30 | 40 | 50 | 60 | 70 | 80 | 90 | 100 |
|---|---|---|---|---|---|---|---|---|---|---|
| Size (μm) | 15.88 | 17.25 | 18.38 | 19.40 | 20.42 | 21.52 | 22.84 | 24.64 | 27.59 | 30.83 |

Wherein the average particle size is represented at the 50% distribution point (i.e. about 20 μm) and the standard deviation is about 4.4, making the standard deviation about 22% of the average particle size.

It is possible that the second mixture may contain diamond particles having a particle size outside of the 15 micron to 25 micron range so long as the standard deviation for the second mixture is not greater than 35%, preferably less than 35%. In some non-limiting embodiments, it is possible that the second mixture may contain diamond particles having a particle sizes outside of the 15 micron to 25 micron range so long as the standard deviation for the second mixture is less than 25%, preferably less than 15%. In some non-limiting embodiments, the second mixture may contain up to 3.25 wt. % of diamond particles having a particle size that is less than 15 μm. In some embodiments, the second mixture may contain up to 8 wt. % of diamond particles having a particle size that is greater than 30 μm.

The coating layer of the present invention may comprise diamond particles in amount that ranges from about 1.5 wt. % to about 5.5 wt. %, a based on the total weight of the coating layer. In some embodiments, the coating layer may comprise about 2 wt. % to about 5.5 wt. % of diamond particles. In some embodiments, the coating layer may comprise about 2 wt. % to about 3.7 wt. % of diamond particles. It has been discovered that the coating layer of the present invention may exhibit the desired scratch resistance and gloss retention properties when using abrasion resistant particles that consist of only diamond particles in the above recited amounts. It has also been found that exceeding diamond particle loading amounts of 5.5 wt. %, there may be a undesirable effect to the visual properties of the coating layer.

Figure 1:
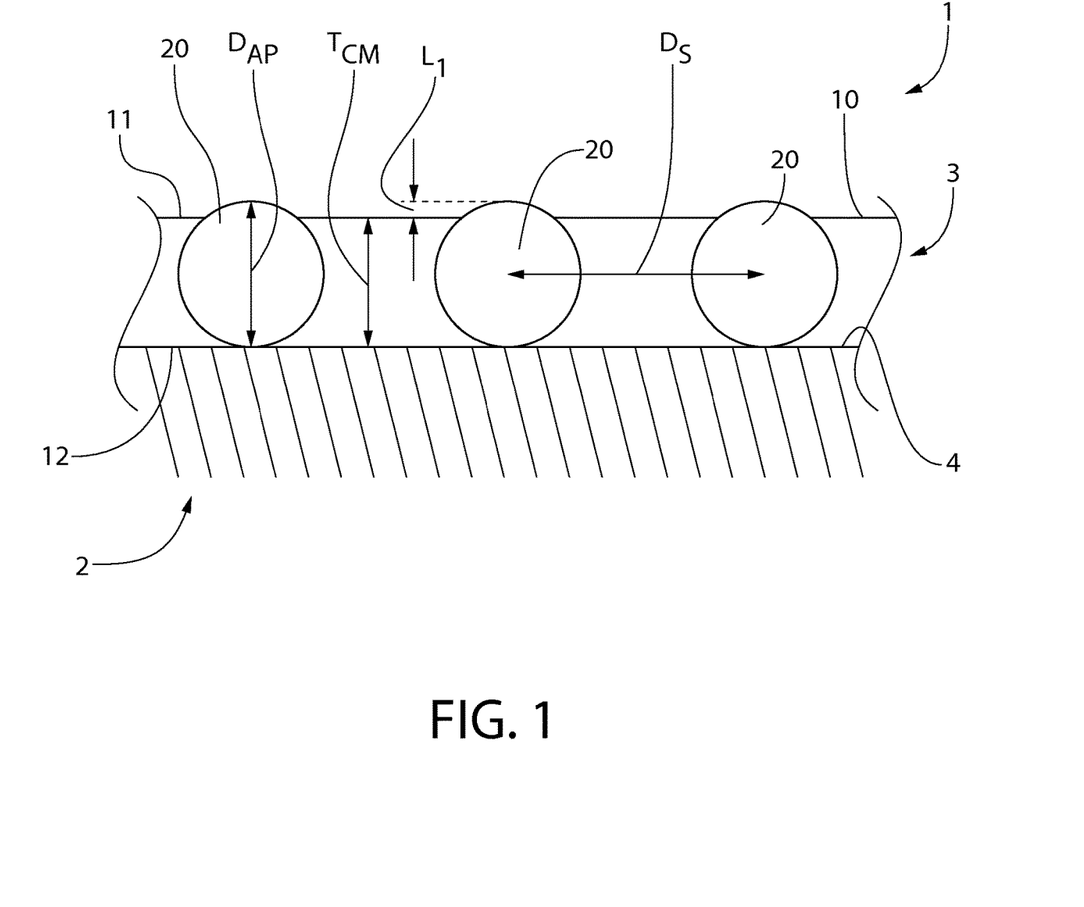
FIG. 1 is a cross-sectional view of the floor covering according to one embodiment of the present invention.
Figure 2:
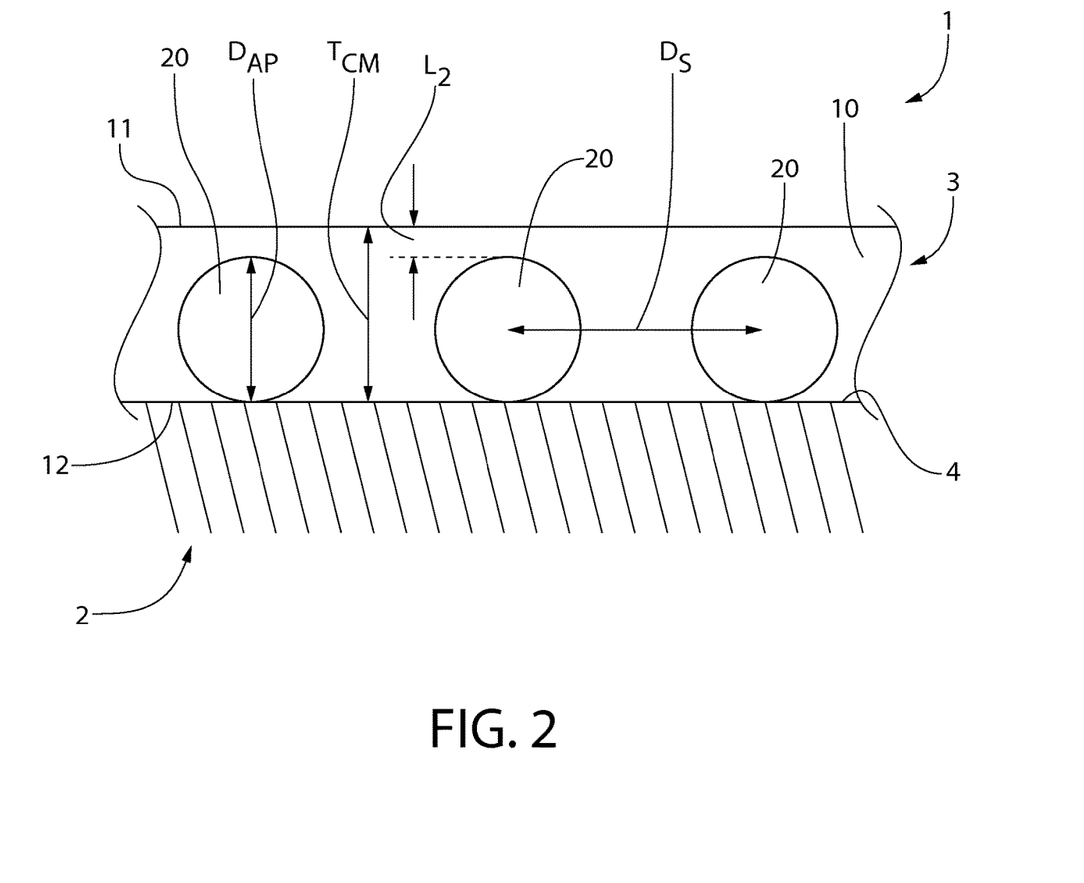
FIG. 2 is a cross-sectional view of the floor covering according to another embodiment of the present invention.
Figure 3:
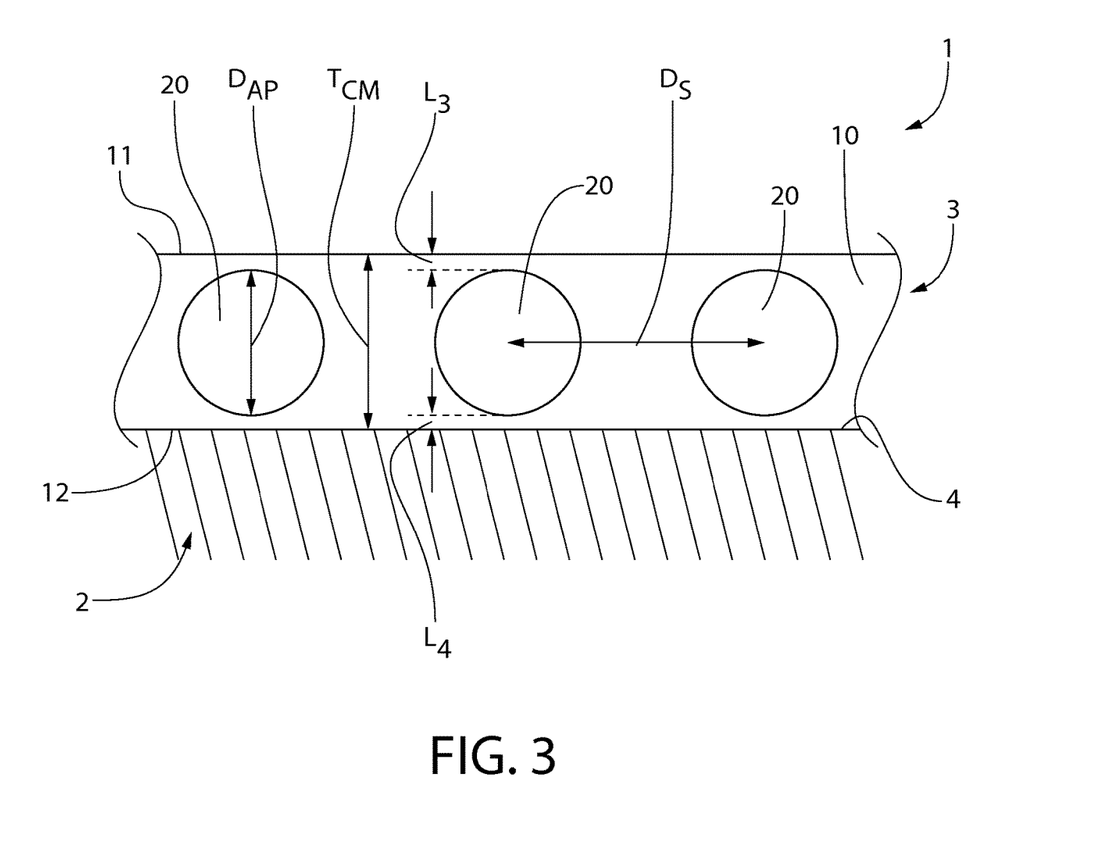
FIG. 3 is a cross-sectional view of the floor covering according to another embodiment of the present invention.

As shown in FIGS. 1-3, the floor covering 1 of the present invention includes a coating layer 3 and a substrate 2. The coating layer 3 comprises abrasion resistant particles 20 and coating matrix 10. The thickness of the coating layer may vary across the top surface of the coating layer based on the surface topography defined by the abrasion resistant particles 20 positioned within the coating matrix 10. The coating matrix has a top surface 11 and a bottom surface 12. The bottom surface 12 of the coating matrix 10 abuts the top surface 4 of the substrate 2, or in the case of multi-layer floor coverings, the top surface of the underneath coating layer (not pictured). The top surface 11 of the coating matrix 10 is the upward exposed face that is uninterrupted between protruding abrasion resistant particles 20 that are positioned in the coating matrix 10.

The average coating matrix thickness $T_{CM}$ is the vertical distance measure between the top surface 11 and bottom surface 12 of the coating matrix 10. According to some embodiments, the average matrix coating thickness $T_{CM}$ may range from about 4 μm to about 40 μm—including all integers therebetween. According to some embodiments, the average matrix coating thickness $T_{CM}$ may range from about 6 μm to about 20 μm—including all integers therebetween. According to some embodiments, the average matrix coating thickness $T_{CM}$ is 6 μm. According to some embodiments, the average matrix coating thickness $T_{CM}$ is 18 μm.

According to some embodiments of the present invention, the dimensions of the diamond particles and the coating matrix may be selected such that a ratio of the average coating matrix thickness $T_{CM}$ to average particle size $D_{AP}$ of the diamond particles 20 ranges (the TD ratio) from about 0.7:1 to about 2:1. In some embodiments, the TD ratio of the average matrix coating thickness $T_{CM}$ to the average particle size $D_{AP}$ of the diamond particles 20 ranges from about 0.9:1 to 2:1.

In some embodiments of the present invention, the average particle size $D_{AP}$ of the diamond particles 20 and the average coating matrix thickness $T_{CM}$ may be outside of the previously discussed size ranges so long as, together, the average coating matrix thickness $T_{CM}$ and the average particle size $D_{AP}$ of the diamond particles 20 satisfy the ratio of 0.6:1 to 2:1, preferably from 0.9:1 to 2:1.

The TD ratio ranging from 0.6:1 to 2:1 provides that at least some of the diamond particles 20 may protrude from the top surface 11 of the coating matrix 10 by a first length $L_1$ when the TD ratio of coating matrix thickness $T_{CM}$ to average particle size $D_{AP}$ of diamond particles 20 ranges from 0.6:1 to 0.99:1. According to some embodiments the first length $L_1$ is a distance equal to about 1% to about 43% of the average coating matrix thickness $T_{CM}$—including all integers therebetween.

The specific distance of the first length $L_1$ will depend on the specific size of the diamond particles 20 as well as the average coating matrix thickness $T_{CM}$. However, in some embodiments the first length $L_1$ may ranges from about 0.2 μm to about 6 μm (based on diamond particles 20 that have an average particle size $D_{AP}$ of about 20 μm). In alternative embodiments, the first length $L_1$ may range from 0.08 μm to about 2.5 μm (based on diamond particles 20 having an average particle size $D_{AP}$ of about 8 μm).

Although not depicted by the figures, in some embodiments, the TD ratio ranging from 0.9:1 to 1.1:1 would provide for at least some of the diamond particles having a particle size about equal to the average coating matrix thickness. In such embodiments, the diamond particles are positioned within close proximity to the top surface of the coating matrix.

As depicted in FIG. 2, using a TD ratio of about 1:1 to 2:1 would provide for at least some of the diamond particles 20 being fully encompassed by the coating matrix 10. The resulting coating layer 3 has the diamond particles 20 submerged under the top surface 11 of the coating matrix 10 by a second length $L_2$—as measured from the top of the diamond particle 20 to the top surface 11 of the coating matrix 10. According to some embodiments the second length $L_2$ is a distance equal to about 1% to about 50% of the average coating matrix thickness $T_{CM}$—including all integers therebetween.

The specific distance of the second length $L_2$ will depend on the particle size of the diamond particle 20 as well as the average coating matrix thickness $T_{CM}$. However, in some embodiments the second length $L_2$ may range from about 0.2 μm to about 20 μm (based on diamond particles 20 have an average particle size $D_{AP}$ of about 20 μm). In alternative embodiments, the second length $L_2$ may range from 0.08 μm to about 8 μm (based on diamond particles 20 having an average particle size $D_{AP}$ of about 8 μm).

As depicted in FIG. 3, some embodiments of the present invention provide that the UV curable coating matrix 10 may be partially cured during or immediately after the application of the coating layer 3. The partial curing secures the diamond particles 20 in place within the coating matrix 10 before the diamond particles 20 are able to completely settle and drop to the bottom surface 12 of the coating matrix 10. According to some embodiments, partially curing the coating matrix can create a third length $L_3$ and a fourth length $L_4$—the third length $L_3$ measured from the top surface 11 of the coating matrix 10 to the top of the diamond particle 20 and the fourth length $L_4$ being measured from the bottom surface of the diamond particle 20 to the bottom surface 12 of the coating matrix 10.

The third length $L_3$ may be equal to 5% to 95% of the second length $L_2$—including all integers therebetween. In some embodiments the third length $L_3$ is equal to about 50% of the second length $L_2$ The third length $L_3$ may be created without having to change the average particle size $D_{AP}$ of the diamond particle 20 or the average coating matrix thickness $T_{CM}$. By partially curing the coating matrix 10 the downward movement of the diamond particle 20 caused by gravitational pull is stopped, and the diamond particle 20 is held in vertical position before it can fully settled to the bottom surface 12 of the coating matrix 10. Therefore, a corresponding gap is created between the bottom of the diamond particle 20 and the bottom surface 12 of the coating matrix 10—the gap being represented by a fourth length $L_4$. The sum of the third length $L_3$ and fourth length $L_4$ is equal the second length $L_2$ for a given average particle size $D_{AP}$ and average coating matrix thickness $T_{CM}$.

In some embodiments, the coating matrix may further comprise other additives and fillers, such as a surfactant, as pigments, tackifiers, surfactant, matting agents, fillers such as glass or polymeric bubbles or beads (which may be expanded or unexpanded), hydrophobic or hydrophilic silica, calcium carbonate, glass or synthetic fibers, blowing agents, toughening agents, reinforcing agents, fire retardants, antioxidants, and stabilizers. The additives are added in amounts sufficient to obtain the desired end properties. Suitable surfactants of the present invention include, but are not limited to, fluorinated alkyl esters, polyether modified polydimethylsiloxanes and fluorosurfactants, having the formula $R_f CH_2 CH_2 O(CH_2 CH_2 O)_x H$, wherein $R_f = F(CF_2 CF_2)_y$, x=0 to about 15, and y=1 to about 7. The surfactant may be present in the radiation curable adhesive composition by an amount ranging from about 0.5 wt. % to about 2 wt. %, preferably about 0.8 wt. %.

In some non-limiting embodiments, the coating layer may be produced according to the following master batch methodology. The coating matrix is comprised of the binder, dispersing agent, photoinitiator, and matting agent. The abrasion resistant particles comprise diamond particles. The components making up the binder are first combined and mixed together at room temperature with high speed agitation. For the purposes of the present application, the term high speed agitation means agitation with a blade at rotation speeds of at least 2,000 RPM. A dispersing agent may be added concurrently with the binder components or after the binder components have been blended together. The dispersing agents may be selected from acrylic block-copolymers, such as commercially available BYK DISPERBYK® 2008, DISPERBYK® 2155, DISPERBYK® 145 and DISPERBYK® 185, Lubrizol SOLSPERSE® 41000 and SOLSPERSE® 71000, and may be present in the coating layer by an amount ranging from 0.1 wt. % to 1 wt. %.

Next, the photoinitiator is slowly added at room temperature. In some alternative embodiments, the photoinitiator may be added at 45° C. with high speed agitation. Once the photoinitiator is entirely dissolved into the master batch mixture, matting agents and the abrasion resistant particles may be added. The matting agent and abrasion resistant particles may be added to the master batch as the final ingredients to the blend of coating matrix and diamond particles. The matting agent and abrasion resistant particles should be added slowly to avoid a powder layer from forming and floating on top of coating matrix. Once added, the binder, dispersing agent, photoinitiator, matting agent, and abrasion resistant particles are mixed with high speed agitation for a period ranging from about 5 to about 15 minutes, preferably about 10 minutes. During the agitations, the blade may be moved up and down to ensure proper mixing of the ingredients in the master batch. The temperature of the master batch may increase during agitation, therefore to prevent premature thermal curing of the binder, the master batch may be cooled during agitation.

The fully blended coating matrix and diamond particles have a viscosity ranging from about 600 to about 1300 cPs at room temperature (74° F.) as measured by a Brookfield Viscometer using spindle #6 at 100 RPM. In some embodiments of the present invention, the viscosity allows the blend of coating matrix and diamond particles to be applied to a substrate by roll coating at room temperature. The substrates may selected from linoleum tile, ceramic tile, natural wood planks, engineered wood planks, vinyl tile—such as luxury vinyl tile ("LVT"), and resilient sheet—such as homogeneous or heterogeneous commercial resilient sheets and residential resilient sheets. After applying the blend of coating matrix and diamond particles to the substrate, the blend is exposed to UV radiation in air or a nitrogen environment.

The UV radiation includes UVA, UVB, UVC, and UVV sources. Non-limiting examples of UV partial cure radiation include UVA radiation of 0.189 J/cm$^2$; UVB radiation of 0.163 J/cm$^2$; UVC radiation of 0.01 J/cm$^2$; and UVV radiation may be 0.092 J/cm$^2$. The pre-cure temperature may be 30° C.-40° C. and the coating composition may be exposed to the UV radiation at a line speed ranging from about 25 to 75 FPM. Non-limiting examples of UV full cure include UVA radiation of 1.006 J/cm$^2$; UVB radiation of 0.886 J/cm$^2$; UVC radiation of 0.126 J/cm$^2$; and UVV radiation may be 0.504 J/cm$^2$. To fully cure, the coating composition may be exposed to the UV radiation at a line speed ranging from about 25 to 75 FPM. The delay between the pre-cure/partial cure and the full cure ranges from about 3 seconds to about 10 seconds. The fully cured coating matrix containing the diamond particles forms the coating layer of the floor covering.

As previously discussed, the UV curable coating matrix can be partially cured in some embodiments to prevent the abrasion resistant particles from fully settling within coating matrix. In some embodiments, the floor covering may contain two or three coating layers, each additional coating layer positioned on top of the previously applied coating layer. According to this embodiment, the additional coating layers may each be partially or fully cured before application of the subsequent coating layer to prevent the diamond particles of each coating layer from fully settling.

In some embodiments, the fully cured coating layer may have an average coating thickness that ranges from about 4 µm to about 40 µm. In some embodiments, the fully cured coating layer may have an average coating thickness that ranges from about 6 µm to about 20 µm. The specific thickness of the coating layer will depend on the average particle size of the abrasion resistant particles, as previously discussed.

As shown in FIGS. 1-3, some embodiments provide that after the coating layer 3 is applied to a substrate 2 and cured, the diamond particles 20 dispersed throughout the coating matrix 10 and spaced apart by an average separation distance Ds ranging from about 20 µm to about 75 µm—including all integers therebetween. In some embodiments the average separation distance Ds ranges from about 30 µm to about 65 µm. In some embodiments the average separation distance Ds ranges from about 32 µm to about 62 µm.

According to the present invention, the TD ratio of average coating matrix thickness to average diamond particle size in combination with each low standard deviation in diamond particles sizes results in the coating layer having not only superior abrasion resistance but also superior retention on the surface finish of the coating layer, e.g., gloss. Specifically, there is little variation in the first length of the diamond particles that protrude from the top surface of the coating matrix. With such regularity, the amount of protrusion becomes much better controlled, thereby eliminating diamond particles that protrude too far from the coating matrix. With fewer diamond particles protruding too far from the coating matrix, there are less diamond particles that may be inadvertently dislodged from the coating matrix when a shear force (i.e. contact with a shoe) is applied to the coating layer during use, thereby limiting the likelihood that the abrasion resistance particles can be dislodged from the coating matrix, which would not only result in an uneven surface finish of the coating layer but the released abrasion resistant particles being free to abrade the top surface of the coating matrix, thereby exacerbating the wear on the coating layer of the floor covering. The degree of premature abrasion resistant particle "pop-outs" would ultimately determine the wear rate of the coating layer, and, therefore, the floor covering. Abrasions resistant particles held firmly in place would create a more wear resistant floor covering than a floor covering where the abrasions resistant particles are popped out with relative ease and low shear force.

It has also been discovered that the particle size distribution provides for greater uniformity between particles within the coating matrix, thereby enhancing the structural integrity of the coating matrix within the coating layer. As a result when shear force is applied to the coating layer during use (e.g. contact with a shoe), the overall coating layer is less likely to deform and can better withstand abrasion and maintain the desired level of gloss. Surprisingly, it has been also found that utilizing a coating having a TD ratio equal to or lager than 1 and less than or equal to 2 improves abrasion resistance of the coated surface, unlike the prior art understanding that the abrasion resistant particles need to be protruded above the coating matrix surface to provide abrasion resistance.

The present invention has been disclosed in conjunction with UV curable coating compositions for illustration purposes only, and other curable coating compositions, such as moisture curable urethane coating compositions, 2K urethane coating compositions, epoxy coating compositions and acrylic coating compositions, can be utilized.

The following examples were prepared in accordance with the present invention. The present invention is not limited to the examples described herein.

EXAMPLES

Experiment 1

A first set of tests were run to compare abrasion resistant coatings comprising abrasion resistant particles of aluminum oxide and diamond. The abrasions resistant coatings were formed from coating matrixes having a Binder 1 comprising:

i. 25 grams of Eternal EC6360—polyester acrylate;
ii. 25 grams of Allnex, EB8602—urethane acrylate;
iii. 20 grams of tricyclodecane dimethanol diacrylate;
iv. 7 grams of trimethylolpropane triacrylate;
v. 10 grams of isobornyl acrylate;
vi. 9 grams of 2-phenoxythyl acrylate;
vii. 9 grams of hexanediol diacrylate; and
viii. 4 grams of BlueStar Silicon, Scla UV RCA 170—silicon acrylate.

The resin was mixed with high speed agitation at room temperature (74° F.) with the addition of 0.5736 grams of dispersing agent. The dispersing agent being BYK Disperbyk 2008—an acrylic block-copolymer. Next 4.54 grams of amine synergist (Sartomer CN 371) and 5.91 grams of photoinitiator were added with high speed agitation until completely dissolved in the mixture. The photoinitiator includes 4.73 grams of diphenyl ketone and 1.18 grams of 1-hydroxy-cyclohexyl phenyl ketone.

Next, 21.41 grams of matting agent and the various amounts of abrasion resistant particles were added to each mixture of Examples 0-6. The matting agent includes the following:

i. 10.39 grams of Arkema, ORGASOL® 3501 EX D NAT1—a polyamide 6/12;
ii. 3.37 grams of MicroPowder Fluo HT having a particle size ranging from 2 μm to 4 μm; and
iii. 7.65 grams of Evonik ACEMATT® 3600—silica.

The matting agent and abrasion resistance particles are added slowly, the mixture is agitated for at least 10 minutes with high speed agitation. The diamond particles and aluminum oxide particles are commercially available and obtained from Yuxing Sino Crystal Micron, LTD and Micro Abrasives Corp, respectively. After the high speed agitation, the resulting curable coating composition is discharged from the mixer and applied to a substrate by roll coating. Once applied to the substrate, the curable coating composition is cured by UV radiation, thereby forming the coating layer of the floor covering.

TABLE 1

|  | Ex. 0 | Ex. 1 | Ex. 2 | Ex. 3 | Ex. 4 | Ex. 5 | Ex. 6 |
|---|---|---|---|---|---|---|---|
| Binder 1 | 109 | 109 | 109 | 109 | 109 | 109 | 109 |
| Amine Synergist | 4.54 | 4.54 | 4.54 | 4.54 | 4.54 | 4.54 | 4.54 |
| Photoinitiator | 5.91 | 5.91 | 5.91 | 5.91 | 5.91 | 5.91 | 5.91 |
| Matting Agent | 21.41 | 21.41 | 21.41 | 21.41 | 21.41 | 21.41 | 21.41 |
| Dispersing Agent | 0.57 | 0.57 | 0.57 | 0.57 | 0.57 | 0.57 | 0.57 |
| Aluminum Oxide (20 μm) | 0 | 0 | 0 | 0 | 0 | 0 | 5.45 |
| Aluminum Oxide (D50% 5.6 μm-6.75 μm) | 0 | 0 | 5.45 | 10.68 | 35.42 | 0 | 0 |
| Diamond (6 μm-10 μm)[1] | 0 | 5.45 | 0 | 0 | 0 | 0 | 0 |
| Diamond (15 μm-25 μm)[2] | 0 | 0 | 0 | 0 | 0 | 5.45 | 0 |
| Total (weight in grams) | 141.43 | 146.88 | 146.88 | 152.112 | 176.86 | 146.88 | 146.88 |
| Viscosity (cps)* | 850 | 900 | 890 | 1025 | 1750 | 1075 | 915 |

Note:
*viscosity at room temperature (74° F.) as measured by a Brookfield Viscometer using spindle #6 at 100 RPM
[1]Diamond particles having an average particle size of 8 μm and a standard deviation of 1.7
[2]Diamond particles having an average particle size of 20 μm and a standard deviation of 4.4

Each coating layer was then abraded with 30 passes using 100 grit sand paper and applying 50 g weight. A Gardner abrasion tester was used, which is available from BYK Gardner. After abrading, each sample was visually compared by a panel of eight test evaluators for retention of desired visual appearance—wherein the rank of visual appearance was calculated on a scale of 0 to 1. A value of 0 being the best having minimal abrasion, and a value of 1 being the worst having visually significant and noticeable abrasions. The results are provided in Table 2.

TABLE 2

| Scratch Resistance and Gloss Retention | Ex. 0 | Ex. 1 | Ex. 2 | Ex. 3 | Ex. 4 | Ex. 5 | Ex. 6 |
|---|---|---|---|---|---|---|---|
| Flat White Tile | 0.97 | 0.31 | 0.75 | 0.77 | 0.57 | 0.18 | 0.59 |
| Lt Wood LVT | 0.87 | 0.16 | 0.55 | 0.98 | 0.71 | 0.28 | 0.62 |
| DK Wood LVT | 0.83 | 0.16 | 0.8 | 0.67 | 0.92 | 0.2 | 0.49 |
| Engineered Wood | 0.9 | 0.2 | 0.76 | 0.76 | 0.92 | 0.3 | 0.56 |
| Average | 0.89 | 0.21 | 0.72 | 0.80 | 0.78 | 0.24 | 0.57 |

The coating layers containing diamond particles not only performed better than the coating layers containing aluminum oxide particles, but the diamond particles allowed for much less loading of abrasion resistant particles in the coating layer. The coating composition with diamond particles not only provided significantly improved abrasion-resistance, but also without increasing the viscosity of the coating composition, making the coating composition easier to apply.

Experiment 2

A second set of tests were run to compare abrasion resistant coatings comprising abrasion resistant particles of aluminum oxide and diamond at different loading amounts using a UV curable binder—PPG R30983MF, which is a UV curable acrylate coating binder, available from PPG. The abrasions resistant coating layers were formed from coating matrixes having a Binder 2, the coating layers of Examples 7-14 comprising:

TABLE 3

|  | Ex. 7 | Ex. 8 | Ex. 9 | Ex. 10 | Ex. 11 | Ex. 12 | Ex. 13 | Ex. 14 |
| --- | --- | --- | --- | --- | --- | --- | --- | --- |
| Binder 2 | 100 | 100 | 100 | 100 | 100 | 100 | 100 | 100 |
| Aluminum Oxide (20 μm) | 0 | 0 | 0 | 4.0 | 8.0 | 12.0 | 16.0 | 24.0 |
| Diamond (6 μm-10 μm)[3] | 0 | 0 | 4.0 | 0 | 0 | 0 | 0 | 0 |
| Diamond (15 μm-25 μm)[4] | 0 | 4.0 | 0 | 0 | 0 | 0 | 0 | 0 |
| Total (weight in grams) | 100 | 104 | 104 | 104 | 108 | 112 | 116 | 124 |
| Viscosity (cPs) | 700 | 700 | 750 | 750 | 800 | 860 | 975 | 1250 |

Note:
* viscosity at room temperature (74° F.) as measured by a Brookfield Viscometer using spindle #6 at 100 RPM
[3] Diamond particles having an average particle size of 8 μm and a standard deviation of 1.7
[4] Diamond particles having an average particle size of 20 μm and a standard deviation of 4.4

Each coating layer was cured with UV radiation then abraded using 100 grit sand paper and 2.1 pound weight with 30 passes. After abrading, each sample was compared for retention of desired visual appearance—wherein the rank of visual appearance was calculated on a scale of 0 to 1. A value of 0 being the best and a value of 1 being the worst. The results are provided in Table 4.

TABLE 4

| Scratch Resistance and Gloss Retention | Ex. 7 | Ex. 8 | Ex. 9 | Ex. 10 | Ex. 11 | Ex. 12 | Ex. 13 | Ex. 14 |
| --- | --- | --- | --- | --- | --- | --- | --- | --- |
| Homogeneous Resilient Commercial Vinyl Sheet | 0.97 | 0.08 | 0.21 | 0.79 | 0.91 | 0.66 | 0.74 | 0.48 |

The coating layers containing diamond particles not only performed better than the coating layers containing aluminum oxide particles, but the diamond particles allowed for much less loading of abrasion resistant particles in the coating layer.

Experiment 3

A third set of tests were run to compare different loading amounts of the diamond particles within the coating layer of the floor covering—the coating layer being a low gloss ("MG") coating layer. The abrasions resistant coatings were formed from coating matrixes having a Binder 2 comprising:
 i. 17.5 grams of Eternal EC6360—polyester acrylate;
 ii. 32.5 grams of Allnex, EB8602—urethane acrylate;
 iii. 20 grams of tricyclodecane dimethanol diacrylate;
 iv. 7 grams of trimethylolpropane triacrylate;
 v. 10 grams of isobornyl acrylate;
 vi. 9 grams of 2-phenoxythyl acrylate;
 vii. 9 grams of hexanediol diacrylate; and
 viii. 2 grams of BlueStar Silicon, Scla UV RCA 170—silicon acrylate.

The resin was mixed with high speed agitation at room temperature (74° F.). Next 4.46 grams of amine synergist (Sartomer CN 371) and 5.8 grams of photoinitiator were added with high speed agitation until completely dissolved in the mixture. The photoinitiator includes 4.64 grams of diphenyl ketone and 1.16 grams of 1-hydroxy-cyclohexyl phenyl ketone. The photoinitiator may be added at room temperature of 45° C. with the aid of high speed agitation.

Next, 5.4 grams of matting agent and the various amounts of abrasion resistant particles were added to each mixture of Examples 0-6. The matting agent includes the following:
 i. 2.39 grams of Arkema, ORGASOL® 3501 EX D NAT1—a polyamide 6/12; and
 ii. 3.01 grams of MicroPowder Polyfluo 523 XF having a particle size ranging from 3 μm to 6 μm.

The matting agent and abrasion resistance particles are added slowly, the mixture is agitated for at least 10 minutes with high speed agitation in accordance with the amounts set forth in Examples 15-18 shown in Table 5. After the high speed agitation, the resulting curable coating composition is discharged from the mixer and applied to a substrate by roll coating to a coating thickness of 6 μm. Once applied to the substrate, the curable coating composition is cured by UV radiation, thereby forming the MG coating layers of the floor covering.

TABLE 5

|  | Ex. 15 | Ex. 16 | Ex. 17 | Ex. 18 |
| --- | --- | --- | --- | --- |
| Binder 2 | 107 | 107 | 107 | 107 |
| Amine Synergist | 4.46 | 4.46 | 4.46 | 4.46 |
| Photoinitiator | 5.8 | 5.8 | 5.8 | 5.8 |
| Matting Agent | 5.4 | 5.4 | 5.4 | 5.4 |
| Diamond (6 μm-10 μm)[5] | 2.675 | 5.35 | 8.025 | 10.7 |
| Amount of Diamond | 2.1% | 4.2% | 6.1% | 8.0% |
| Total | 125.34 | 128.01 | 130.69 | 133.69 |

The cured MG coating layers were tested with a Gardner Abrasion tester, available from BYK Gardner, for the level of gloss retained using 100 grit sand paper and applied weight of 2.1 pound with 30 passes. Each sample as analyzed for percentage of gloss retention and Δb color change value. The results are set forth in Table 6.

[5] Diamond particles having an average particle size of 8 μm and a standard deviation of 1.7

TABLE 6

|  | Gloss Retention % | Δb Color Value |
|---|---|---|
| Ex. 15 | 74 | 1.57 |
| Ex. 16 | 96 | 1.85 |
| Ex. 17 | 99 | 2.37 |
| Ex. 18 | 89 | 2.66 |

According to Chart 1, each of the MG coating layers exhibit a gloss retention after the scratch test of at least 70%. The gloss retention begins to worsen as the amount of diamond particles becomes greater than 6 wt. %. Furthermore, as shown in Chart 2, the color value—as represented by Δb value—increases with corresponding increases in the amount of diamond particles in the MG coating layer. For the purposes of this invention, it is desirable that the color Δb value remain as low as possible because higher Δb values result in a MG coating layer having a yellow appearance. Therefore, it has been discovered that at diamond particle loading amounts ranging between 2 wt. % and under 6 wt. %—preferably 5.5 wt. %—the resulting MG coating layer not only exhibits desirable abrasion resistance and gloss retention properties, but also will not exhibit a color Δb value that interferes with the desired aesthetic appearance of the MG coating layer.

Delta b (Δb) or difference in b values between the control and a sample indicates the degree of yellowing. The degree of yellowing is measured by use of a calorimeter that measures tristimulas color values of 'a', 'b', and 'L', where the color coordinates are designated as +a (red), -a (green), +b (yellow), -b (blue), +L (white), and -L (black).

Experiment 4

A fourth set of tests were run to compare different loading amounts of the diamond particles within the coating layer of the floor covering—the coating layer being a low gloss ("LG") coating layer. The LG abrasions resistant coatings were formed from coating matrixes having a Binder 2 comprising:
  i. 25 grams of Eternal EC6360—polyester acrylate;
  ii. 25 grams of Allnex, EB8602—urethane acrylate;
  iii. 20 grams of tricyclodecane dimethanol diacrylate;
  iv. 7 grams of trimethylolpropane triacrylate;
  v. 10 grams of isobornyl acrylate;
  vi. 9 grams of 2-phenoxythyl acrylate;
  vii. 9 grams of hexanediol diacrylate; and
  viii. 3 grams of BlueStar Silicon, Scla UV RCA 170—silicon acrylate.

The resin was mixed with high speed agitation at room temperature (74° F.) with the addition of 0.5166 grams of dispersing agent. The dispersing agent being BYK Disperbyk 2008—an acrylic block-copolymer. Next 4.5 grams of amine synergist (Sartomer CN 371) and 5.86 grams of photoinitiator were added with high speed agitation until completely dissolved in the mixture. The photoinitiator includes 4.5 grams of diphenyl ketone and 1.17 grams of 1-hydroxy-cyclohexyl phenyl ketone.

Next, 20.21 grams of matting agent and the various amounts of abrasion resistant particles were added to each mixture of Examples 0-7. The matting agent includes the following:
  i. 10.29 grams of Arkema, ORGASOL® 3501 EX D NAT1—a polyamide 6/12;
  ii. 3.03 grams of MicroPowder Fluo HT having a particle size ranging from 2 μm to 4 μm; and
  iii. 6.89 grams of Evonik ACEMATT® 3600—silica.

The matting agent and abrasion resistance particles are added slowly, the mixture is agitated for at least 10 minutes with high speed agitation in accordance with the amounts set forth in Examples 19-21 shown in Table 6. After the high speed agitation, the resulting curable coating composition is discharged from the mixer and applied to a substrate by roll coating to a coating thickness of 6 μm. Once applied to the substrate, the curable coating composition is cured by UV radiation, thereby forming the LG coating layer of the floor covering.

TABLE 7

|  | Ex. 19 | Ex. 20 | Ex. 21 |
|---|---|---|---|
| Binder 2 | 108 | 108 | 108 |
| Amine Synergist | 4.50 | 4.50 | 4.5 |
| Photoinitiator | 5.86 | 5.86 | 5.86 |
| Matting Agent | 20.21 | 20.21 | 20.21 |
| Dispersing Agent | 0.5166 | 0.5166 | 0.5166 |
| Diamond (6 μm-10 μm)[6] | 5.4 | 8.1 | 10.8 |
| Amount of Diamond | 3.7% | 5.5% | 7.2% |
| Total | 144.49 | 147.186 | 149.89 |

The cured LG coating layers were then abraded with 100 grit abrading paper with 30 passes. Each sample as analyzed for percentage of gloss retention and Δb color change value. The results are set forth in Table 8.

[6] Diamond particles having an average particle size of 8 μm and a standard deviation of 1.7

TABLE 8

|  | Gloss Retention % | Δb Color Value |
|---|---|---|
| Ex. 19 | 91 | 1.64 |
| Ex. 20 | 98 | 2.14 |
| Ex. 21 | 116 | 2.14 |

Experiment 5

A fifth set of tests were run to compare different ratios of coating matrix thickness to average size of diamond particles. The coating matrix of Experiment 5 is in accordance with the compositions described in the present invention. The fourth set of tests further compares the different average particle spacing $T_S$ between diamond particles within the coating layer. Each coating layer was prepared according to the high agitation blending previously discussed and applied to a substrate by roll coating. The coating layer was then cured with UV radiation and abraded with 100 grit abrading paper with 30 passes. After abrading, each sample was compared for retention of desired visual appearance—wherein the rank of visual appearance was calculated on a scale of 0 to 1. A value of 0 being the best and a value of 1 being the worst. The results are provided in Table 9.

TABLE 9

|  | Ex. 22 | Ex. 23 | Ex. 24 | Ex. 25 | Ex. 26 | Ex. 27 | Ex. 28 |
|---|---|---|---|---|---|---|---|
| Diamond (6 μm-10 μm)[7] | 3.7 wt. % | 3.7 wt. % | 3.7 wt. % | 3.7 wt. % | 3.7 wt. % | 3.7 wt. % | 3.7 wt. % |
| Coating Matrix Thickness | 3.7 μm | 5.7 μm | 6.9 μm | 9.4 μm | 12.2 μm | 16.0 μm | 20.5 μm |
| $T_{CM}:D_{AP}$ Ratio | 0.46:1 | 0.72:1 | 0.86:1 | 1.18:1 | 1.53:1 | 2:1 | 2.56:1 |
| $T_S$ - Average Particle Separation Distance | 77 μm | 62 μm | 57 μm | 49 μm | 43 μm | 37 μm | N/A[8] |
| Scratch Resistance and Gloss Retention | 0.92 | 0.63 | 0.51 | 0.41 | 0.44 | 0.60 | N/A[9] |

[7]Diamond particles having an average particle size of 8 μm and a standard deviation of 1.7
[8]Using a ratio of 2.56:1 resulted in difficulty in handling and applying the coating layer to the substrate by roll coating
[9]Using a ratio of 2.56:1 resulted in difficulty in handling and applying the coating layer to the substrate by roll coating The coating layers produced using a ratio of average coating matrix thickness to average particle size of the diamond particles within the range of 0.6:1 to 2:1 resulted in a coating layer exhibiting superior abrasion resistance and gloss retention as well as provided sufficient operability in handling and applying the coating layer to the substrate as compared to coating layers produced using a ratio outside of the range of 0.6:1 to 2:1.

Experiment 6

A sixth set of tests were performed to demonstrate the multi-layer coating layers for the flooring composition by comparing different ratios of coating matrix thickness to average size of diamond particles as well as the different average particle spacing $T_S$ between diamond particles within the coating layer. The coating matrix of Experiment 6 is in accordance with the compositions described in the present invention. Each example describes a single layer within the three-layered coating layer. Each of the single coating layers were produced according to the previously discussed master batch high agitation blending process. The first layer was applied directly to the substrate by roll coating and partially cured. The second and third subsequent layers were applied in the same manner and each individually partially cured before the subsequent layer was applied. After fully curing the multi-layered coating layer, the top surface of the coating layer was abraded with 100 grit sand paper using 30 passes with 2.1 pound weight applied. The results are provided in Table 10.

TABLE 10

|  | Ex. 29 | Ex. 30 |
|---|---|---|
| Diamond (6 μm-10 μm)[10] | 3.7 wt. % | 3.7 wt. % |
| Coating Matrix Thickness | 4.6 μm | 7.5 μm |
| $T_{CM}:D_{AP}$ Ratio | 0.58:1 | 0.94:1 |
| $T_S$ - Average Particle Separation Distance | 70 μm | 55 μm |
| Scratch Resistance and Gloss Retention | 0.27 | 0.14 |

After abrading, each sample was compared for retention of desired visual appearance. After abrading, each sample was compared for retention of desired visual appearance—wherein the rank of visual appearance was calculated on a scale of 0 to 1. A value of 0 being the best having minimal abrasion, and a value of 1 being the worst having visually significant and noticeable abrasions.

[10]Diamond particles having an average particle size of 8 μm and a standard deviation of 1.7

As those skilled in the art will appreciate, numerous changes and modifications may be made to the embodiments described herein, without departing from the spirit of the invention. It is intended that all such variations fall within the scope of the invention.

The invention claimed is:

1. A floor covering comprising
a substrate, and
a coating layer comprising:
  a coating matrix formed from a curable coating composition comprising a binder, wherein the coating matrix has an average coating matrix thickness; and
  diamond particles that have an average particle size and a narrow distribution of particle sizes, wherein the average article size is about 2 μm to about 50 μm and the narrow distribution of particle sizes has a standard deviation less than 35% of the average particle size;
wherein a ratio of the average coating matrix thickness to average particle size ranges from 0.6:1 to 2:1.

2. The floor covering of claim 1 wherein the coating layer comprises less than 5.5 wt. % of diamond particles based on the weight of the coating layer.

3. The floor covering of claim 2 wherein the coating layer comprises at least 1.5 wt. % of diamond particles based on the weight of the coating layer.

4. The floor covering of claim 1 wherein the average coating matrix thickness ranges from about 4 μm to about 40 μm.

5. The floor covering of claim 4 wherein the average coating matrix thickness ranges from about 6 μm to about 20 μm.

6. The floor covering of claim 1 wherein the average coating matrix thickness is about 6 μm.

7. The floor covering of claim 1 wherein the average coating matrix thickness is about 18 μm.

8. The floor covering of claim 1 wherein the average coating matrix thickness is measured from a top surface of the coating matrix to a bottom surface of the coating matrix and the diamond particles protrude from the top surface of the coating matrix at a distance ranging from about 1% to about 50% of the coating matrix thickness.

9. The floor covering of claim 1 wherein the average coating matrix thickness is measured from a top surface of the coating matrix to a bottom surface of the coating matrix and the diamond particles are submerged beneath the top surface of the coating matrix at a distance that is about 1% to about 50% of the coating matrix thickness.

10. The floor covering of claim 1 wherein the average coating matrix thickness is measured from a top surface of the coating matrix to a bottom surface of the coating matrix and the diamond particles are submerged beneath the top surface of the coating matrix at a first distance that is about 1% to about 25% of the coating matrix thickness and the diamond particles are vertically offset from the bottom surface of the coating matrix by a second distance that is about 1% to about 25% of the coating matrix thickness.

11. A floor covering comprising
a substrate, and
a coating layer comprising:
a coating matrix formed from a curable coating composition comprising a binder, and
diamond particles that have an average particle size ranging from about 2 µm to about 50 µm;
wherein the diamond particles have an average distance between two adjacently placed particles of from 20 µm to 75 µm.

12. The floor covering of claim 11 wherein the coating layer comprises about 1.5 wt. % to about 5.5 wt. % of the diamond particles based on the weight of the coating layer.

13. The floor covering of claim 11 wherein the coating matrix has an average coating matrix thickness and a ratio of the average coating matrix thickness to the average particle size ranges from 0.6:1 to 2:1.

14. The floor covering of claim 11 wherein the average coating matrix thickness ranges from 4 µm to 40 µm.

15. The floor covering of claim 14 wherein the average coating matrix thickness ranges from 6 µm to 20 µm.

16. The floor covering of claim 11 wherein the average coating matrix thickness is about 6 µm.

17. The floor covering of claim 11 wherein the average coating matrix thickness is about 18 µm.

18. A floor covering comprising
a substrate, and
a coating layer formed from a curable coating composition comprising:
a binder, and
abrasion resistant particles consisting essentially of diamond particles that have an average particle size and a narrow distribution of particle sizes, the narrow distribution of particle sizes has a standard deviation less than 35% of the average particle size;
wherein the diamond particles are present in an amount ranging from about 2 wt. % to about 5.5 wt. % based on the total weight of the coating layer.

19. The floor covering of claim 18 wherein the coating matrix has an average coating thickness ranging from about 4 µm to about 40 µm.

20. The floor covering of claim 18 wherein the coating matrix has an average coating thickness between 6 µm and 20 µm.

* * * * *